United States Patent
Kaneko et al.

(10) Patent No.: US 10,694,141 B2
(45) Date of Patent: Jun. 23, 2020

(54) MULTI-CAMERA SYSTEM, CAMERA, CAMERA PROCESSING METHOD, CONFIRMATION DEVICE, AND CONFIRMATION DEVICE PROCESSING METHOD

(71) Applicant: SONY CORPORATION, Tokyo (JP)

(72) Inventors: Tetsuo Kaneko, Kanagawa (JP); Yasuhiro Iizuka, Kanagawa (JP); Kazuhiro Uchida, Kanagawa (JP); Shigeo Nakatsuka, Tokyo (JP); Shinnosuke Usami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/773,220

(22) PCT Filed: Aug. 2, 2017

(86) PCT No.: PCT/JP2017/028129
§ 371 (c)(1),
(2) Date: May 3, 2018

(87) PCT Pub. No.: WO2018/047542
PCT Pub. Date: Mar. 15, 2018

(65) Prior Publication Data
US 2018/0324383 A1    Nov. 8, 2018

(30) Foreign Application Priority Data
Sep. 12, 2016    (JP) .................................. 2016-177409

(51) Int. Cl.
*H04N 5/77* (2006.01)
*H04N 5/232* (2006.01)
(Continued)

(52) U.S. Cl.
CPC ............... *H04N 5/77* (2013.01); *H04N 5/232* (2013.01); *H04N 5/247* (2013.01); *H04N 7/181* (2013.01);
(Continued)

(58) Field of Classification Search
CPC ........ H04N 7/181; H04N 13/243; H04N 5/77; H04N 21/21805
See application file for complete search history.

(56) References Cited

U.S. PATENT DOCUMENTS

2002/0049979 A1    4/2002  White et al.
2007/0033632 A1*   2/2007  Baynger ............... G11B 27/034
                                                          725/135

(Continued)

FOREIGN PATENT DOCUMENTS

JP    2011-55294    3/2011
JP    2011-91512    5/2011

(Continued)

OTHER PUBLICATIONS

International Search Report dated Mar. 5, 2018 in PCT/JP2017/028129, 5 pages.

(Continued)

*Primary Examiner* — Ahmed A Berhan
(74) *Attorney, Agent, or Firm* — Oblon, McClelland, Maier & Neustadt, L.L.P.

(57) ABSTRACT

A multi-camera system, including a first camera apparatus, and second camera apparatus, and an information processing apparatus. The information processing apparatus includes a communication interface, and processing circuitry that receives a predetermined request from a user while the first camera apparatus captures a first video and the second camera apparatus captures a second video. The processing circuitry, in response to the predetermined request, transmits (Continued)

a first control signal to the first camera apparatus that causes the first camera apparatus to generate a first thumbnail of a frame of the first video, and transmits a second control signal to the second camera apparatus that causes the second camera apparatus to generate a second thumbnail of a frame of the second video. The processing circuitry receives the first thumbnail from the first camera apparatus and the second thumbnail from the second camera apparatus.

15 Claims, 15 Drawing Sheets

(51) Int. Cl.
    *H04N 5/247*         (2006.01)
    *H04N 7/18*           (2006.01)
    *H04N 21/218*       (2011.01)
    *H04N 13/243*      (2018.01)

(52) U.S. Cl.
    CPC ........... *H04N 7/188* (2013.01); *H04N 13/243* (2018.05); *H04N 21/21805* (2013.01)

(56) References Cited

U.S. PATENT DOCUMENTS

| | | | |
|---|---|---|---|
| 2008/0225119 A1 | 9/2008 | Murata | |
| 2009/0085740 A1* | 4/2009 | Klein | G08B 13/19695 340/540 |
| 2012/0079406 A1 | 3/2012 | Medhurst et al. | |
| 2013/0235222 A1* | 9/2013 | Karn | H04N 5/23203 348/211.2 |
| 2014/0152773 A1* | 6/2014 | Ohba | H04N 21/4223 348/46 |

FOREIGN PATENT DOCUMENTS

| | | |
|---|---|---|
| WO | WO 2016/024440 A1 | 2/2016 |
| WO | WO 2016/038978 A1 | 3/2016 |

OTHER PUBLICATIONS

Office Action dated Mar. 31, 2020 in Japanese Patent Application No. 2016-177409 (with English Translation).

* cited by examiner

[FIG. 1]
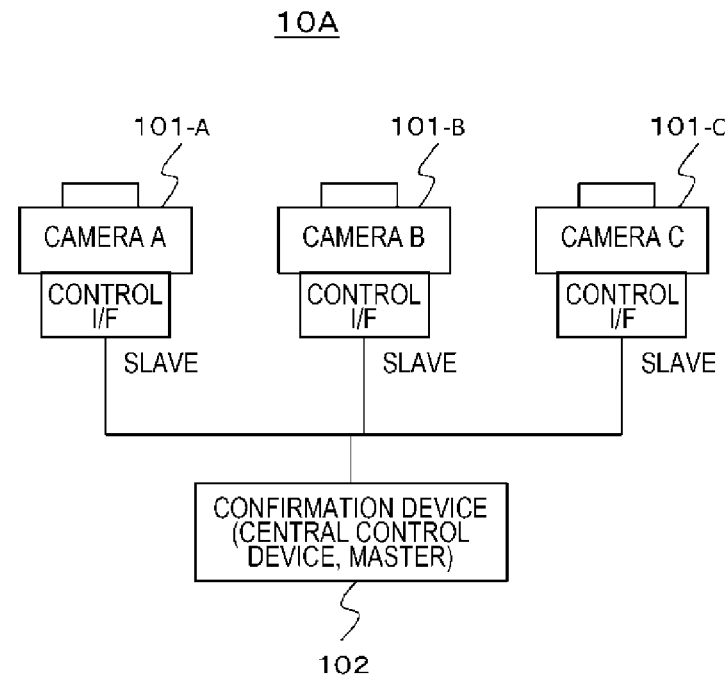
[FIG. 2A]
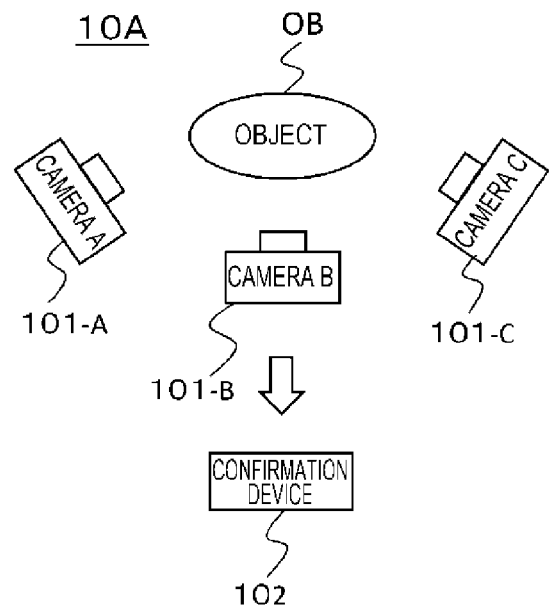

[FIG. 2B]
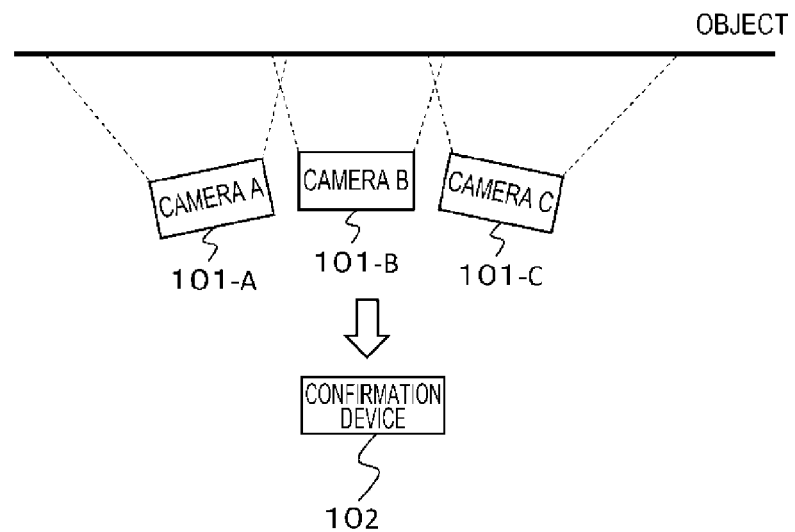
[FIG. 3]
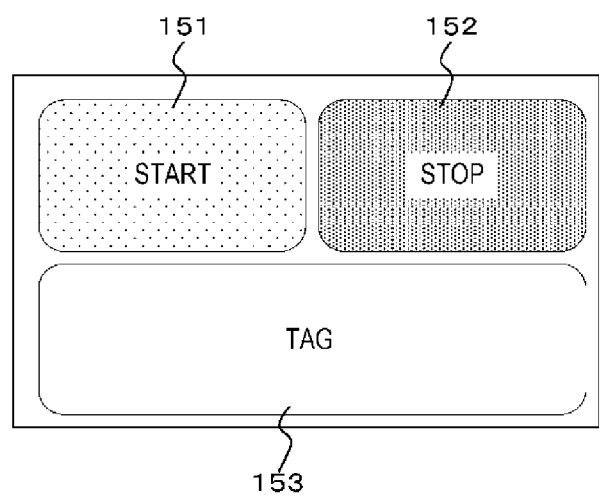

[FIG. 4]
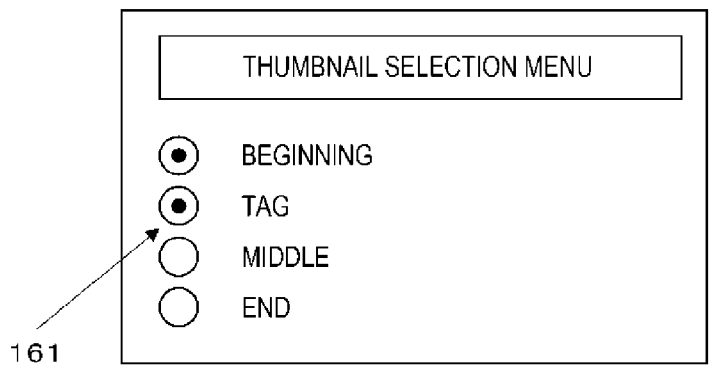
[FIG. 5]
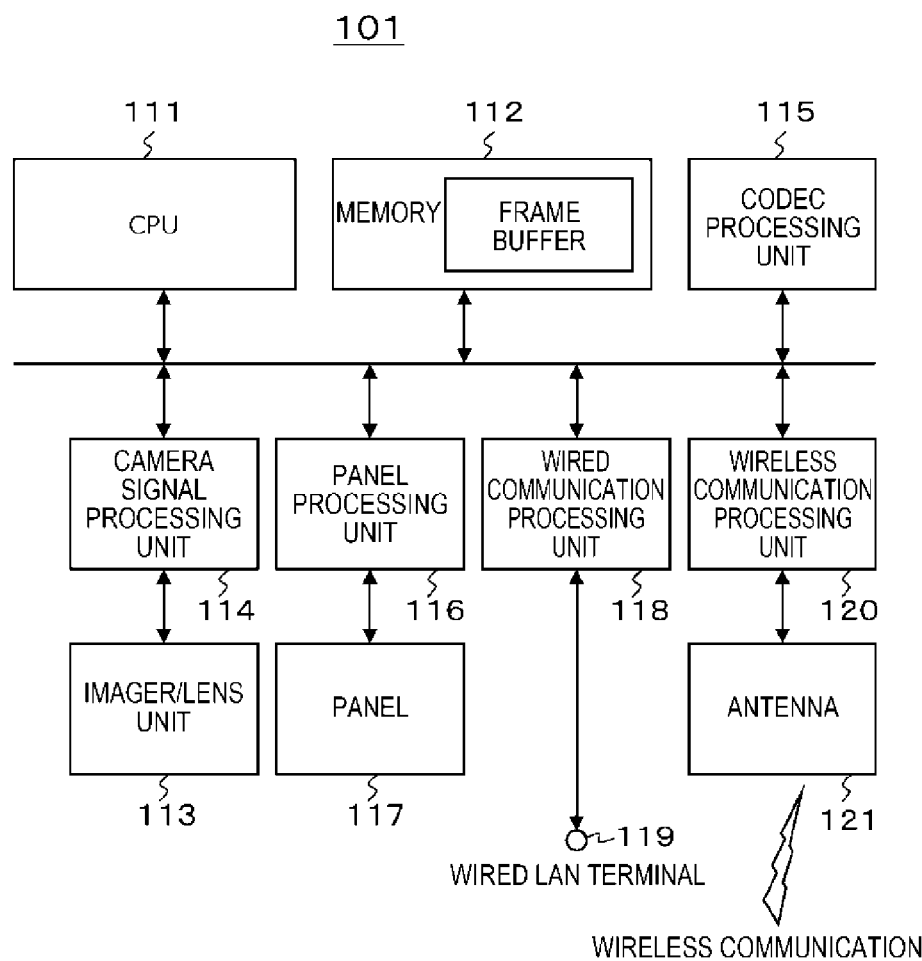

[FIG. 6]
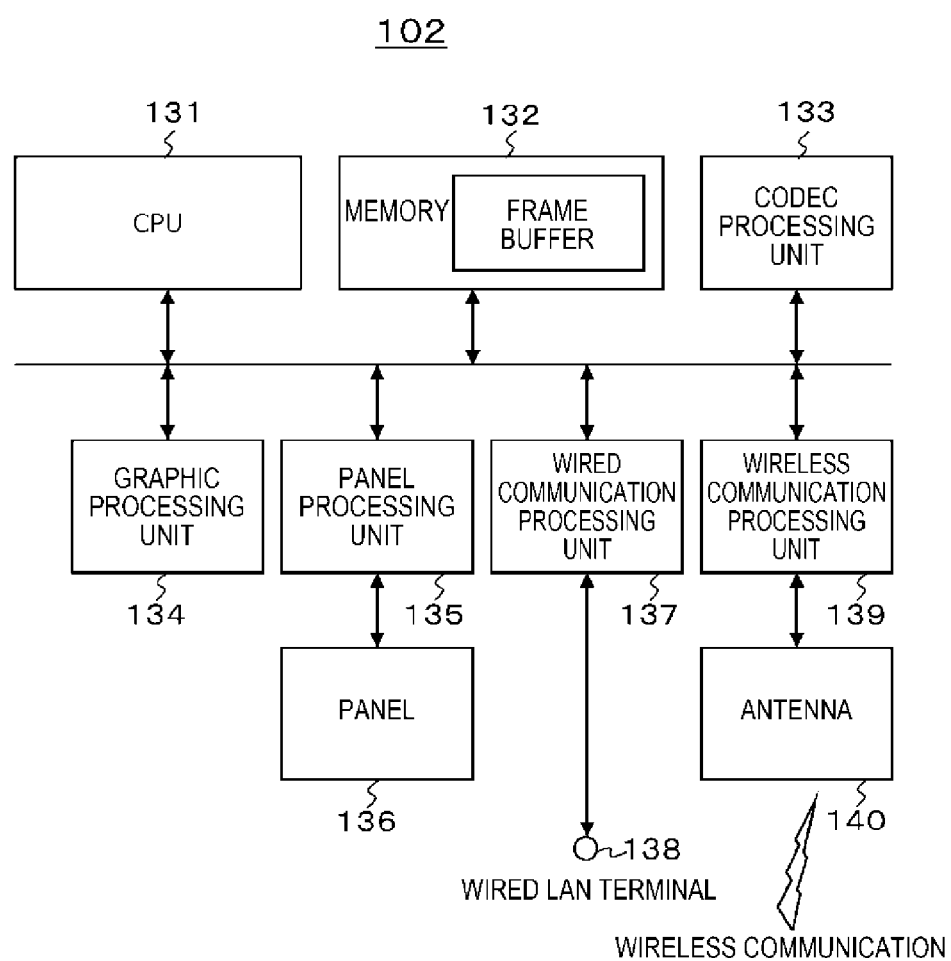

[FIG. 7]
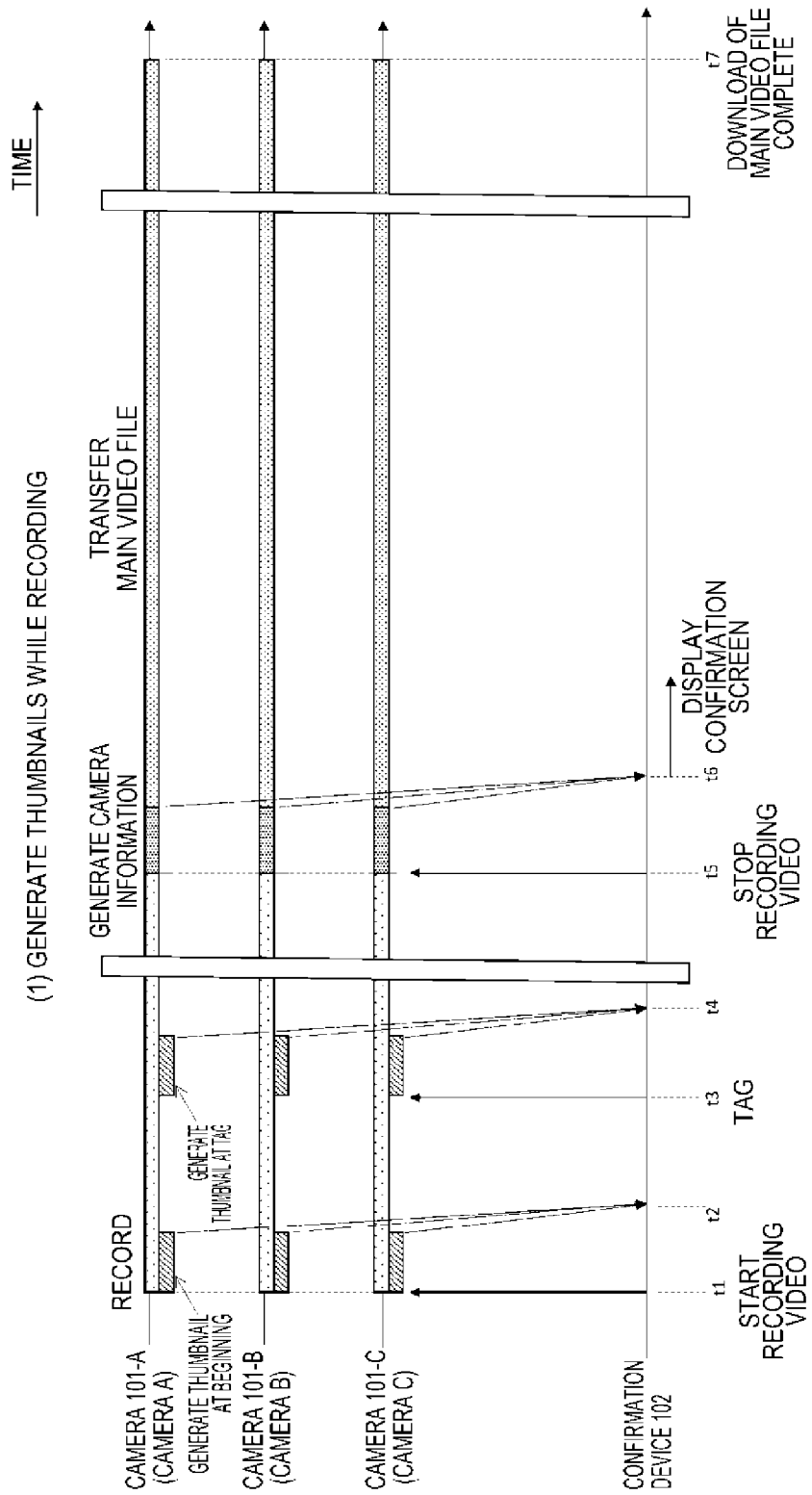

[FIG. 8]
EXAMPLES OF CAMERA INFORMATION
- SETTING VALUES
  - SHUTTER SPEED/WB/APERTURE/EXPOSURE/ISO ETC.
  - IMAGE SIZE, FRAME RATE/CODEC FORMAT ETC.
- RECORDING TIMES
  - RECORDING START TIME/STOP TIME ETC.
- SYNCHRONIZATION INFORMATION
  - Genlock FLAG ETC.
- FILE SIZE
  - ALERT IF FILE IS EXTREMELY LARGE OR SMALL
[FIG. 9]
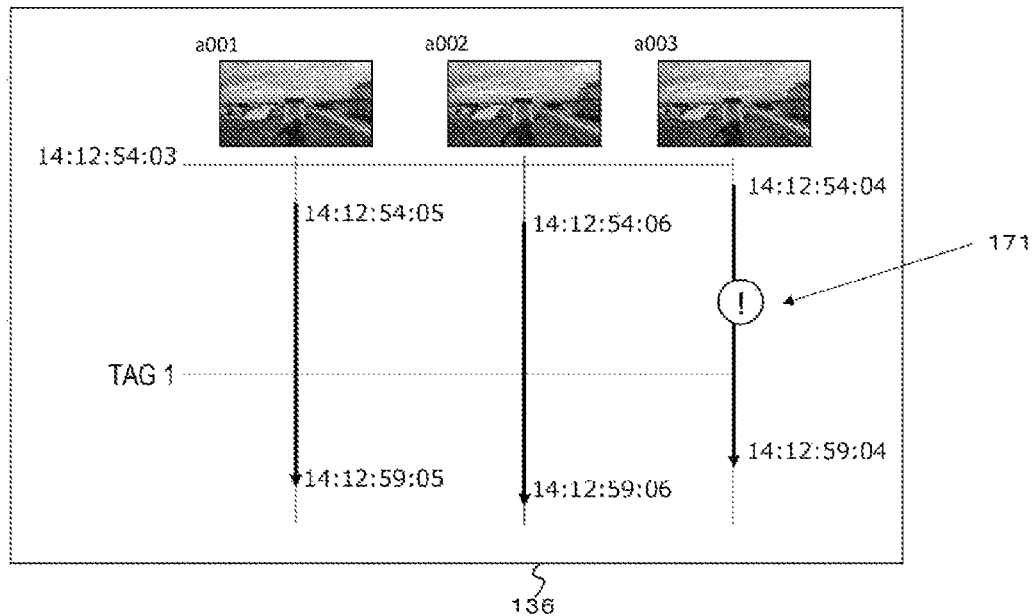

[FIG. 10]
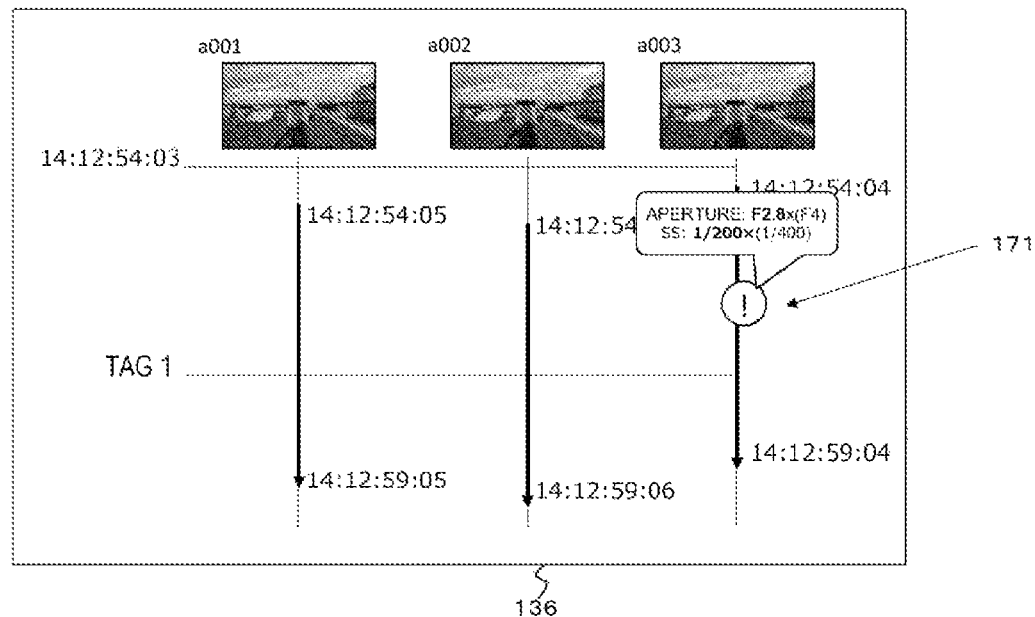
[FIG. 11]
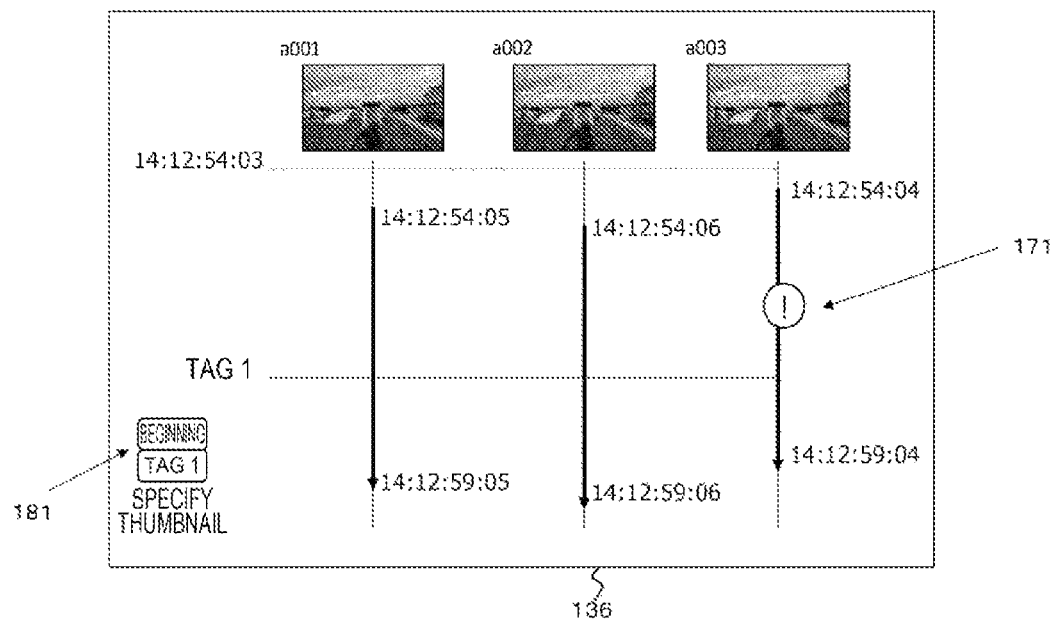

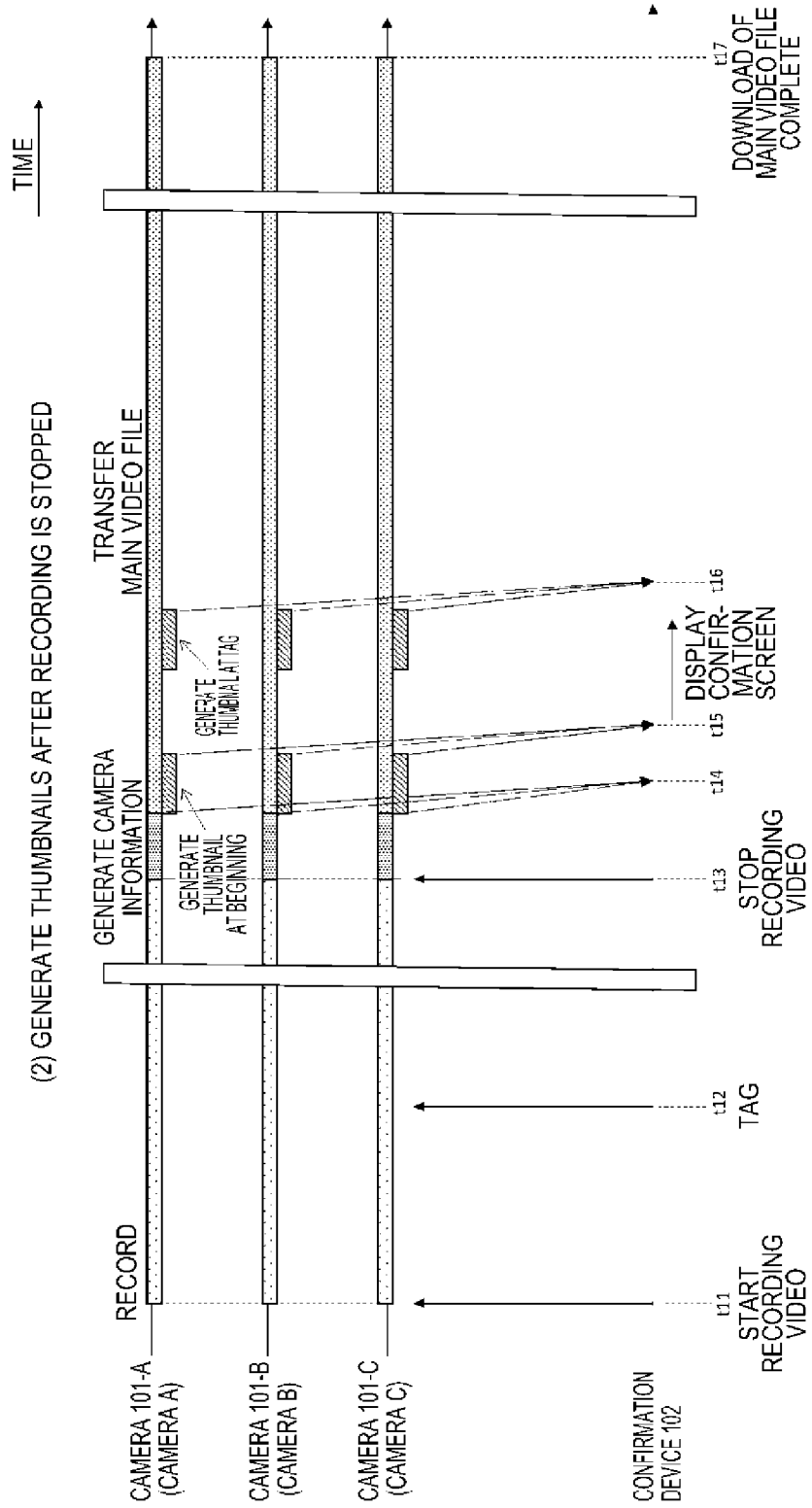
[FIG. 12]

[FIG. 13]
| | CAMERA A | CAMERA B | CAMERA C |
|---|---|---|---|
| REMAINING SPACE ON SD CARD | 20% | 5% ! | 50% |
| BATTERY LEVEL | 90% | 95% | 2% ! |
| HEAT LEVEL | OK | OK | FAIRLY HIGH |
| COMMUNICATION STATUS | OK | ERROR 1% | OK |
CONFIRMATION SCREEN
[FIG. 14]
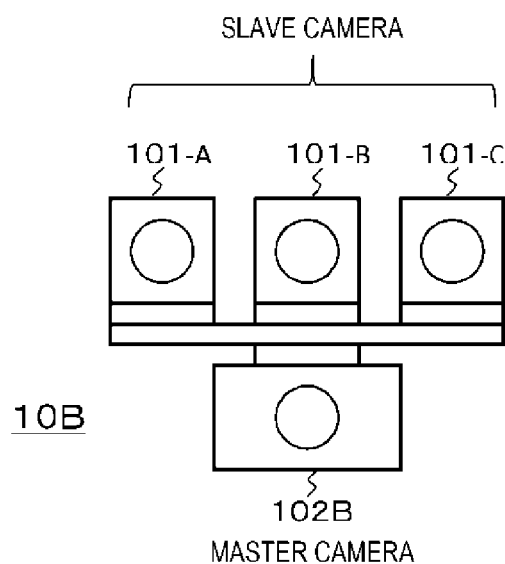

[FIG. 15]
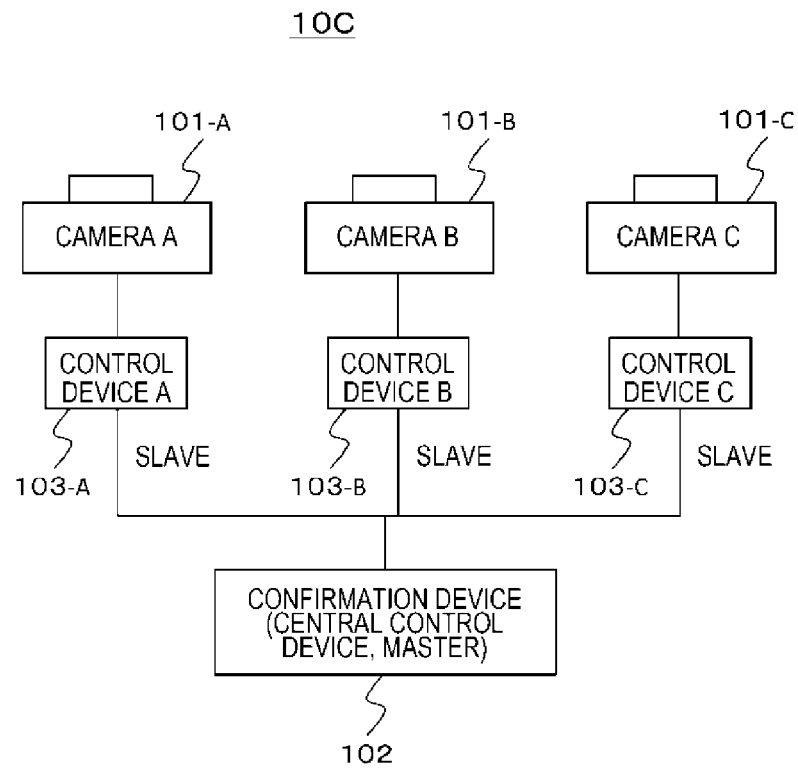
[FIG. 16]
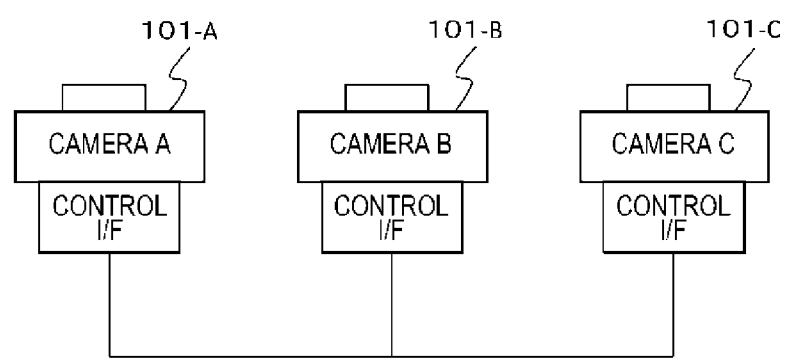

[FIG. 17]
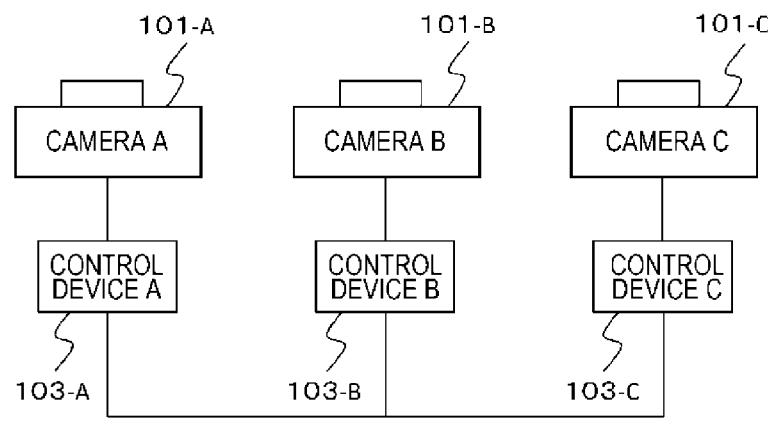

MULTI-CAMERA SYSTEM, CAMERA, CAMERA PROCESSING METHOD, CONFIRMATION DEVICE, AND CONFIRMATION DEVICE PROCESSING METHOD

CROSS REFERENCE TO RELATED APPLICATIONS

This application claims the benefit of Japanese Priority Patent Application JP 2016-177409 filed Sep. 12, 2016, the entire contents of which are incorporated herein by reference.

TECHNICAL FIELD

The present technology relates to a multi-camera system, a camera, a camera processing method, a confirmation device, and a confirmation device processing method.

BACKGROUND ART

In the case of shooting video at the same time with dozens of cameras, confirming whether the video was successfully shot as intended with each camera involves playing back each file on the camera itself, or downloading and playing back files one at a time on a personal computer, which is time-consuming. Also, it is not known whether or not the moment (scene) that one absolutely wants to record is included in the video unless the video is played back. Furthermore, in the case of intending to shoot with the same settings, in some cases one may not notice when on-site that settings are different between cameras.

For example, PTL 1 discloses a technology that generates thumbnail image data for multiple still images and video, enabling one to search video content to find desired content in a short time. However, with this technology, one does not confirm whether or not the video was successfully shot as intended by each of multiple cameras.

CITATION LIST

Patent Literature

PTL 1: JP 2005-117369A

SUMMARY OF INVENTION

Technical Problem

A purpose of the present technology is to enable one to favorably confirm whether or not a video was successfully shot as intended by each of multiple cameras.

Solution to Problem

According to an embodiment of the present disclosure, there is provided a multi-camera system, including a first camera apparatus, a second camera apparatus, and an information processing apparatus. The information processing apparatus includes a communication interface, and processing circuitry configured to receive a predetermined request from a user while the first camera apparatus captures a first video and the second camera apparatus captures a second video. The processing circuitry is configured to, in response to the predetermined request, transmit, via the communication interface, a first control signal to the first camera apparatus that causes the first camera apparatus to generate a first thumbnail of a frame of the first video, and transmit, via the communication interface, a second control signal to the second camera apparatus that causes the second camera apparatus to generate a second thumbnail of a frame of the second video. The processing circuitry is further configured to receive the first thumbnail from the first camera apparatus, and receive the second thumbnail from the second camera apparatus.

According to an embodiment of the present disclosure, there is provided an information processing apparatus including a communication interface, and processing circuitry configured to receive a predetermined request from a user while a first camera apparatus captures a first video and a second camera apparatus captures a second video. The processing circuitry is configured to, in response to the predetermined request, transmit, via the communication interface, a first control signal to the first camera apparatus that causes the first camera apparatus to generate a first thumbnail of a frame of the first video, and transmit, via the communication interface, a second control signal to the second camera apparatus that causes the second camera apparatus to generate a second thumbnail of a frame of the second video. The processing circuitry is further configured to receive the first thumbnail from the first camera apparatus, and receive the second thumbnail from the second camera apparatus.

Accordingly to an embodiment of the present disclosure, there is provided a non-transitory computer-readable medium storing instruction which when executed by a computer cause the computer to perform a method of obtaining thumbnails, the method including receiving a predetermined request from a user while a first camera apparatus captures a first video and a second camera apparatus captures a second video. The method includes, in response to the predetermined request, transmitting to the first camera apparatus a first control signal that causes the first camera apparatus to generate a first thumbnail of a frame of the first video, and transmitting to the second camera apparatus a second control signal that causes the second camera apparatus to generate a second thumbnail of a frame of the second video. The method further includes receiving the first thumbnail from the first camera apparatus, and receiving the second thumbnail from the second camera apparatus.

Advantageous Effects of Invention

According to an embodiment of the present technology, whether or not a video was successfully shot as intended by each of the multiple cameras may be favorably confirmed. Note that the advantageous effects described in this specification are merely for the sake of example and non-limiting, and there may be additional advantageous effects.

BRIEF DESCRIPTION OF DRAWINGS

FIG. 1 is a block diagram illustrating an exemplary configuration of a multi-camera system.

FIG. 2A is a diagram illustrating an installation state of multiple cameras.

FIG. 2B is a diagram illustrating an installation state of multiple cameras.

FIG. 3 is a diagram illustrating an example of a UI screen displayed on a display of a confirmation device, by which a user performs an operation of starting and stopping recording, and a tagging operation.

FIG. 4 is a diagram illustrating an example of a UI screen displayed on a display of a confirmation device, by which a user performs a selection operation causing thumbnail images at some timing to be displayed on the display.

FIG. 5 is a block diagram illustrating an exemplary configuration of a camera.

FIG. 6 is a block diagram illustrating an exemplary configuration of a confirmation device.

FIG. 7 is a timing chart for explaining an example of the actions of multiple cameras and a confirmation device.

FIG. 8 is a diagram for explaining camera information transmitted from multiple cameras to a confirmation device.

FIG. 9 is a diagram illustrating an example of a confirmation screen displayed on a display (panel) of a confirmation device.

FIG. 10 is a diagram illustrating an example of a confirmation screen in a case of performing an operation on an alert icon.

FIG. 11 is a diagram illustrating an example of a confirmation screen in which the toggling of thumbnail images is enabled.

FIG. 12 is a timing chart for explaining another example of the actions of multiple cameras and a confirmation device.

FIG. 13 is a diagram illustrating an example of a list display of the settings and state of each camera, displayed on a display (panel) of a confirmation device.

FIG. 14 is a diagram illustrating another exemplary configuration of a multi-camera system.

FIG. 15 is a block diagram illustrating another exemplary configuration of a multi-camera system.

FIG. 16 is a block diagram illustrating another exemplary configuration of a multi-camera system.

FIG. 17 is a block diagram illustrating another exemplary configuration of a multi-camera system.

DESCRIPTION OF EMBODIMENTS

Figure 18:
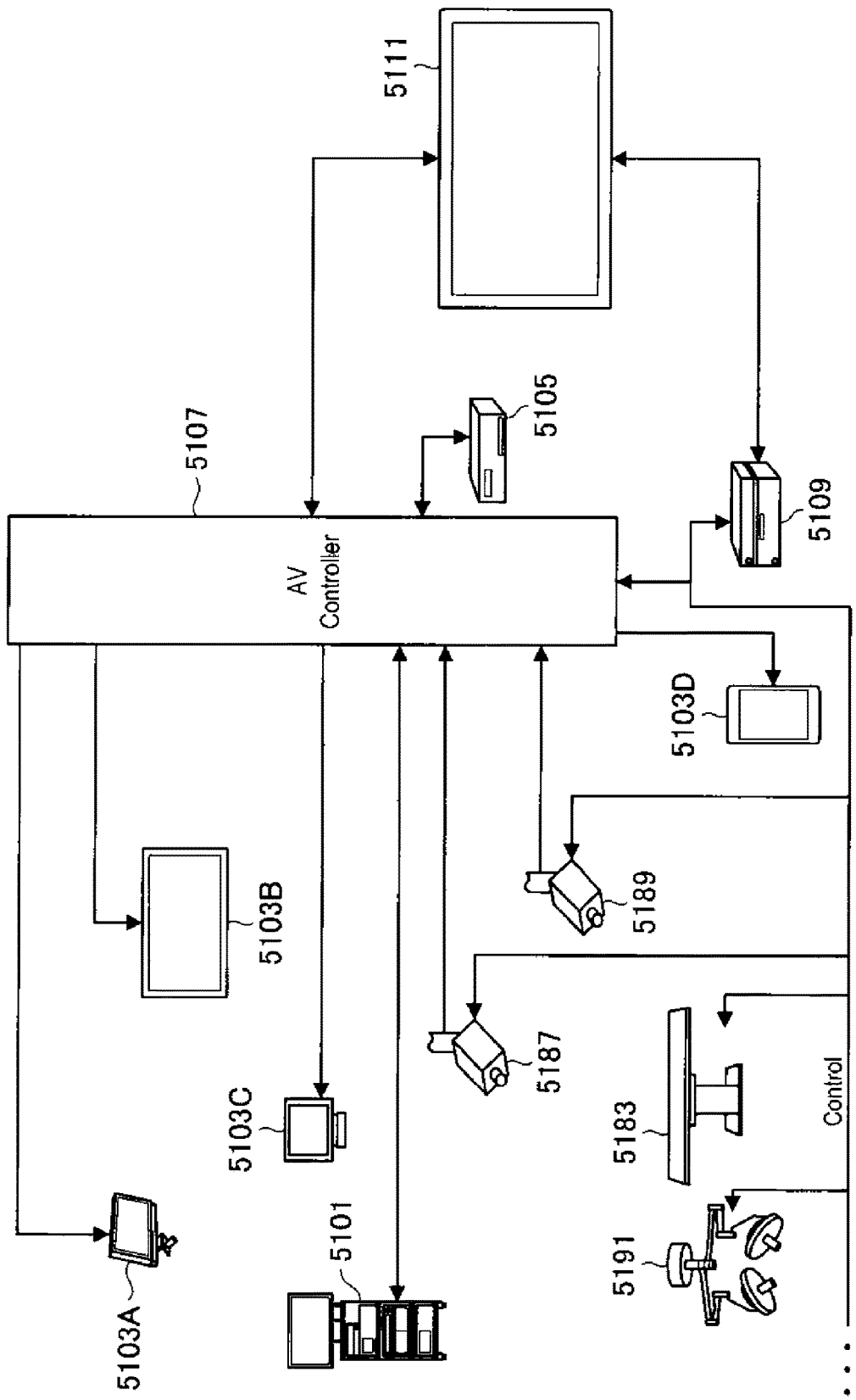
FIG. 18 is a view schematically depicting a general configuration of a surgery room system.

Hereinafter, embodiments for carrying out the present technology (hereinafter designated the exemplary embodiments) will be described. Hereinafter, the description will proceed in the following order.
1. Embodiments
2. Modifications
3. Application 1. Embodiments (Exemplary configuration of multi-camera system)

FIG. 1 illustrates an exemplary configuration of a multi-camera system 10A as an embodiment. The multi-camera system 10A includes multiple (in this case, three) cameras (video cameras), namely a camera (Camera A) 101-A, a camera (Camera B) 101-B, and a camera (Camera C) 101-C. Also, the multi-camera system 10A includes a confirmation device 102 made up of a mobile terminal, such as a smartphone or a tablet, or a personal computer (PC).

The cameras 101-A, 101-B, and 101C are connected to the confirmation device 102 in a LAN, in a wired or wireless manner. For example, the confirmation device 102 constitutes a master device, while each of the cameras 101-A, 101-B, and 101-C constitutes a slave device.

FIG. 2A illustrates an example of the installation state of the cameras 101-A, 101-B, and 101-C. In this example, the cameras 101-A, 101-B, and 101-C are arranged so as to surround an object. With the respective cameras, the object is shot at mutually different angles. FIG. 2B illustrates another example of the installation state of the cameras 101-A, 101-B, and 101-C. In this example, the cameras 101-A, 101-B, and 101-C are lined up in the horizontal direction. With the respective cameras, the object is shot so that there is overlap in the captured images from adjacent cameras, in order to create a panoramic image.

With the confirmation device 102, the user is able to perform an operation of starting and stopping the recording by each camera. Also, in the confirmation device 102, the user is able to perform a tagging operation. FIG. 3 illustrates an example of a UI screen displayed on a display of the confirmation device 102, by which the user performs an operation of starting and stopping recording, and a tagging operation. The user is able to perform an operation of starting recording with a "Start" button 151, and is able to perform an operation of stopping recording with a "Stop" button 152. Additionally, the user is able to perform a tagging operation with a "Tag" button 153. The tagging operation is not limited to being performed one time within the segment from the start of recording until the end of recording, and may also be performed multiple times.

The confirmation device 102 transmits an instruction signal (command) to start and stop recording to each camera, in accordance with the operation of starting and stopping recording performed by the user. Each camera receives the instruction signal via a control interface (control I/F) constituting a communication part, and conducts an action in accordance with the instruction. In this case, each camera conducts a process of writing image data obtained by imaging with an imager to memory, in a certain segment from the start of recording until the end. Note that the control interface of each camera is built into each camera.

Additionally, the confirmation device 102 transmits an information signal carrying information about the time of tagging (timing) to each camera, in accordance with the tagging operation performed by the user. Each camera receives the information signal via the control interface (control I/F). Note that if the "Tag" item is not selected by a thumbnail selection operation performed by the user discussed later, the transmission of the information signal carrying the time of tagging (timing) is not transmitted to each camera, even if the tagging operation is performed by the user. In this case, it is also conceivable not to display the "Tag" item on the UI screen, to preemptively keep the user from performing the tagging operation accidentally.

Also, on the confirmation device 102, the user is able to select whether to display on the display thumbnail images at some timing from among the certain segment from the start of recording until the end, after recording is stopped. This selection operation is performed in advance, before performing the operation of starting recording. FIG. 4 illustrates an example of a UI screen displayed on the display of the confirmation device 102, by which the user performs the selection operation causing thumbnail images at some timing to be displayed on the display.

In this example, selectable thumbnail image timings are displayed as a menu, enabling the selection of the items "Beginning", "Tag", "Middle", and "End". With respect to a radio button 161 displayed in correspondence with each item, the user inputs a check into the radio button of one or more desired items, and thereby is able to select the desired items. In this example, the two items "Beginning" and "Tag" are selected.

The confirmation device 102 transmits to each camera an information signal carrying the selected thumbnail image timing information. Each camera receives the information signal via the control interface (control I/F). After recording is stopped, each camera transmits to the confirmation device 102 the thumbnail image data generated from the image data of the frame at each timing indicated by the thumbnail image timing information.

On the basis of the thumbnail image data sent from each camera, the confirmation device 102 displays respective thumbnail images in association with each camera on the display. In this case, if thumbnail image data at multiple timings is sent, the thumbnail images at each timing are displayed by successively switching out the thumbnail images. In this case, identification information indicating which timing the thumbnail images correspond to may also be displayed at the same time.

Additionally, in this case, the thumbnail images may be switched out continuously, or alternatively, the thumbnail images at a certain timing, such as "Beginning", for example, may be displayed finally in a fixed manner. Also, after this fixed display, switching to a fixed display of the thumbnail images at a desired timing may be enabled with a user operation.

Note that in each camera, the thumbnail image data at each timing is generated after recording is stopped. However, depending on the timing, thumbnail image data may also be generated before recording is stopped. For example, the thumbnail image data at the "Beginning" timing may be generated immediately after the start of recording. As another example, the thumbnail image data at the "Tag" timing may be generated immediately after receiving an information signal carrying information about the time of tagging (timing) from the confirmation device 102.

(Exemplary Configuration of Camera)

FIG. 5 illustrates an exemplary configuration of one of the cameras 101 (101-A, 101-B, 101-C). The camera 101 includes a CPU 111, memory 112, an imager/lens unit 113, a camera signal processing unit 114, and a codec processing unit 115. Also, the camera 101 includes a panel processing unit 116, a panel 117, a wired communication processing unit 118, a wired LAN terminal 119, a wireless communication processing unit 120, and an antenna 121.

The CPU 111 controls the action of each component of the camera 101. The memory 112 constitutes storage for control software storage, a repository of data, a work area for the CPU 111, and the like. Additionally, the memory 112 also constitutes a frame buffer that records captured image data.

The imager/lens unit 113 is made up of an imaging lens and an imager, and images an object to obtain an imaging signal. The camera signal processing unit 114 processes the imaging signal obtained by the imager/lens unit 113 to generate image data corresponding to the object (captured image data). The codec processing unit 115 compresses the image data of each frame obtained by the camera signal processing unit 114, using a JPEG compression process, for example. The image data of each frame compressed in this way is recorded in the frame buffer of the memory 112.

The panel processing unit 116 drives the panel 117 on the basis of the image data obtained by the camera signal processing unit 114, and displays captured images on the panel 117. The panel 117 is made up of an LCD, an organic EL panel, or the like. The panel 117 includes a touch panel function, and a UI for user operations is also displayed on the panel 117 as appropriate.

The wired communication processing unit 118 conducts wired communication with an external device, in this embodiment the confirmation device 102, via the wired LAN terminal 119. The wireless communication processing unit 120 conducts wireless communication with an external device, in this embodiment the confirmation device 102, via the antenna 121. Note that either wired communication or wireless communication is conducted selectively.

(Exemplary Configuration of Confirmation Device)

FIG. 6 illustrates an exemplary configuration of the confirmation device 102. The confirmation device 102 includes a CPU 131, memory 132, a codec processing unit 133, and a graphic processing unit 134. Also, the confirmation device 102 includes a panel processing unit 135, a panel 136, a wired communication processing unit 137, a wired LAN terminal 138, a wireless communication processing unit 139, and an antenna 140.

The CPU 131 controls the action of each component of the confirmation device 102. The memory 132 constitutes storage for control software storage, a repository of data, a work area for the CPU 131, and the like. In addition, the memory 132 records thumbnail image data sent from each camera. Also, if compressed image data is transferred from each camera, the memory 132 also records such data.

To display images, the codec processing unit 133 reads out and decompresses the image data of each frame recorded in the frame buffer of the memory 132. The panel processing unit 135 drives the display panel 136 on the basis of the image data obtained from the decompression by the codec processing unit 133, and displays images on the panel 136. The panel 136 is made up of an LCD, an organic EL panel, or the like. For example, thumbnail images expressed by thumbnail image data sent from each camera are displayed on the panel 136. Also, the panel 136 includes a touch panel function, and a UI for user operations is also displayed on the panel 136 as appropriate.

The wired communication processing unit 137 conducts wired communication with an external device, in this embodiment the cameras 101, via the wired LAN terminal 138. The wireless communication processing unit 139 conducts wireless communication with an external device, in this embodiment the cameras 101, via the antenna 140. Note that either wired communication or wireless communication is conducted selectively.

(Exemplary Action of Multiple Cameras and Confirmation Device)

FIG. 7 illustrates a timing chart illustrating an example of the actions of the cameras 101-A, 101-B, and 101-C, and the confirmation device 102. This example is an example of a case in which "Beginning" and "Tag" are selected as the thumbnail image timings, and in each camera, the thumbnail image data at these timings is generated after recording is stopped.

At a time t1, in response to a recording start operation by the user, an instruction signal (command) to start recording is sent from the confirmation device 102 to each camera. In each camera, recording is started, or in other words, captured image data is compressed and written to memory, on the basis of the instruction signal. In this case, the actual recording start time in each camera is a time after the time t1. Furthermore, these times do not necessarily match, due to factors such as each camera being wirelessly connected to the confirmation device 102.

In each camera, immediately after the start of recording, the thumbnail image data at the "Beginning" timing is generated from the image data of the frame at the beginning of the recording segment. The thumbnail image data at the "Beginning" timing generated by each camera is transferred to the confirmation device 102 at a time t2. Note that herein, the transfer time from each camera is illustrated as the same time t2, but assume that some discrepancy exists among these times.

Additionally, at a time t3, there is a tagging operation by the user on the confirmation device 102, and an information signal carrying timing information about the time t3 is sent from the confirmation device 102 to each camera. On the basis of this information signal, each camera learns that a tagging operation was performed at the time t3, and each camera immediately generates thumbnail image data at the "Tag" timing from the image data of the frame at time t3. The thumbnail image data at the "Tag" timing generated by each camera is transferred to the confirmation device 102 at a time t4. Note that herein, the transfer time from each camera is illustrated as the same time t4, but assume that some discrepancy exists among these times.

Also, at a time t5, in response to a recording stop operation by the user, an instruction signal (command) to stop recording is sent from the confirmation device 102 to each camera. In each camera, recording is stopped on the basis of the instruction signal. In this case, the actual recording stop time in each camera is a time after the time t5. Furthermore, these times do not necessarily match, due to factors such as each camera being wirelessly connected to the confirmation device 102.

In the confirmation device 102, camera information is generated immediately after recording is stopped. As illustrated in FIG. 8, this camera information includes information such as setting values, recording times, synchronization information, and the file size. The camera information generated by each camera is transferred to the confirmation device 102 at a time t6. Note that herein, the transfer time from each camera is illustrated as the same time t6, but assume that some discrepancy exists among these times.

In the confirmation device 102, after the time t6, image data to display on a confirmation screen is generated on the basis of information such as the thumbnail image data and the camera information sent from each camera, and a confirmation screen is displayed on the display (panel 136). Compressed captured image data is also transferred from each camera to the confirmation device 102. Subsequently, at a time t7, this transfer is completed. Note that herein, the completion time for the transfer from each camera is illustrated as the same time t7, but assume that some discrepancy exists among these times.

FIG. 9 illustrates an example of a confirmation screen displayed on the display (panel 136) of the confirmation device 102. In the upper part of the screen, thumbnail images from the cameras 101-A, 101-B, and 101-C are lined up horizontally and displayed in association with each camera. From this display, the user becomes able to recognize whether or not the video was successfully shot as intended by each camera. Herein, "a001" is an indicator that identifies the camera (Camera A) 101-A, "a002" is an indicator that identifies the camera (Camera B) 101-B, and "a003" is an indicator that identifies the camera (Camera C) 101-C.

If thumbnail image data at multiple timings is sent from each camera, the thumbnail images at each timing are displayed by successively switching out the thumbnail images. Although not displayed in the illustrated example, in this case, identification information indicating which timing the thumbnail images correspond to may also be displayed at the same time. As discussed above, when thumbnail image data at the "Beginning" and "Tag" timings is sent, first, the thumbnail images at the "Beginning" timing are displayed, and after that, the thumbnail images at the "Tag" timing are displayed.

In this case, for example, the switching out of the thumbnail images at each timing is repeated continuously. As discussed above, when thumbnail image data at the "Beginning" and "Tag" timings is sent, the thumbnail images are switched between "Beginning", "Tag", "Beginning", "Tag", and so on for a certain amount of time each. Alternatively, in this case, for example, the thumbnail images at a certain timing, such as "Beginning", are displayed finally in a fixed manner. As discussed above, when thumbnail image data at the "Beginning" and "Tag" timings is sent, after switching out the thumbnail images between "Beginning" and "Tag", the thumbnail images at the "Beginning" timing or the "Tag" timing are displayed in a fixed manner, for example.

Also, on the confirmation screen, arrows indicating a certain segment from the start of recording until the end, with attached timestamps of the start and the end of recording, are displayed in association with each camera, namely underneath the thumbnail image from each camera. From this display, the user becomes able to know easily the timestamps of the start and the end of recording by each camera. For example, the illustrated example demonstrates that the time of the start of recording by the camera (Camera A) 101-A is "14:12:54:05", while the time of the end of recording is "14:12:59:05". Note that "14:12:54:03" indicates the time at which the operation of starting recording was performed on the confirmation device 102.

Also, on the confirmation screen, in the certain segment from the start of recording until the end in each camera, the position corresponding to the time of tagging (timing) is displayed. The user thus becomes able to know easily the position of the time of tagging (timing) in each camera. Note that, although not displayed in the illustrated example, in this case, the time of tagging additionally may be displayed.

Also, on the confirmation screen, with regard to the settings for each camera, the existence of a camera with different settings from the others is displayed. In the illustrated example, an alert icon (exclamation mark) 171 is displayed in association with the camera (Camera C) 101-C, thereby indicating that the settings of the camera (Camera C) 101-C are different from the other cameras. Note that the determination of a camera with different settings may be decided by a majority, for example, or a determination may be made by using the settings of a certain camera as a reference.

In this case, by performing a confirmation operation of tapping or clicking the area of the alert icon 171, the user is able to know details about the settings which are different. FIG. 10 illustrates an example of a confirmation screen after performing the confirmation operation. In this example, the aperture is indicated to be F2.8 whereas the others are F4, and the shutter speed is indicated to be ¹⁄₂₀₀ whereas the others are ¹⁄₄₀₀.

Note that, although not discussed above, the alert icon 171 may also be displayed to indicate the existence of a camera which is out of sync with the other cameras, or which has a file size greatly different from the other cameras.

Note that, in a case in which thumbnail image data at multiple timings is sent from each camera, if the thumbnail images at each timing are displayed by being successively switched out, and the thumbnail images at a certain timing are displayed finally in a fixed manner as discussed earlier, after this fixed display, switching to a fixed display of the thumbnail images at a desired timing may be enabled with a user operation. FIG. 11 illustrates an example of a confirmation screen for this case. On the confirmation screen, an operation button 181 for switching out the fixed display of thumbnail images is additionally disposed. This example illustrates a case in which thumbnail image data at the "Beginning" and "Tag" timings is sent from each camera.

FIG. 12 illustrates a timing chart illustrating another example of the actions of the cameras 101-A, 101-B, and 101-C, and the confirmation device 102. This example is an example of a case in which "Beginning" and "Tag" are selected as the thumbnail image timings, and in each camera, the thumbnail image data at these timings is generated before recording is stopped.

At a time t11, in response to a recording start operation by the user, an instruction signal (command) to start recording is sent from the confirmation device 102 to each camera. In each camera, recording is started, or in other words, captured image data is compressed and written to memory, on the basis of the instruction signal. In this case, the actual recording start time in each camera is a time after the time t11. Furthermore, these times do not necessarily match, due to factors such as each camera being wirelessly connected to the confirmation device 102.

Additionally, at a time t12, there is a tagging operation by the user on the confirmation device 102, and an information signal carrying timing information about the time t12 is sent from the confirmation device 102 to each camera. On the basis of this information signal, each camera learns that a tagging operation was performed at the time t12.

Also, at a time t13, in response to a recording stop operation by the user, an instruction signal (command) to stop recording is sent from the confirmation device 102 to each camera. In each camera, recording is stopped on the basis of the instruction signal. In this case, the actual recording stop time in each camera is a time after the time t13. Furthermore, these times do not necessarily match, due to factors such as each camera being wirelessly connected to the confirmation device 102.

In the confirmation device 102, camera information is generated immediately after recording is stopped. This camera information includes information such as setting values, recording times, synchronization information, and the file size (see FIG. 8). The camera information generated by each camera is transferred to the confirmation device 102 at a time t14. Note that herein, the transfer time from each camera is illustrated as the same time t14, but assume that some discrepancy exists among these times.

In each camera, after the camera information is generated, the thumbnail image data at the "Beginning" timing is generated from the image data of the frame at the beginning of the recording segment. The thumbnail image data at the "Beginning" timing generated by each camera is transferred to the confirmation device 102 at a time t15. Note that herein, the transfer time from each camera is illustrated as the same time t15, but assume that some discrepancy exists among these times.

In the confirmation device 102, after the time t15, image data to display on a confirmation screen is generated on the basis of information such as the thumbnail image data and the camera information sent from each camera, and a confirmation screen is displayed on the display (panel 136) (see FIG. 9). On this confirmation screen, the thumbnail images from the respective cameras are thumbnail images at the "Beginning" timing.

Also, in each camera, thumbnail image data at the "Tag" timing is generated subsequently. The thumbnail image data at the "Tag" timing generated by each camera is transferred to the confirmation device 102 at a time t16. Note that herein, the transfer time from each camera is illustrated as the same time t16, but assume that some discrepancy exists among these times.

In the confirmation device 102, on the basis of the thumbnail image data at the "Tag" timing sent from each camera, the thumbnail images on the confirmation screen are switched out to the thumbnail images at the "Tag" timing. Note that in the confirmation device 102, the subsequent display of thumbnail images is similar to the description for the case of FIG. 7 discussed earlier.

Also, similarly to the description for the case of FIG. 7, after recording is stopped, compressed captured image data is also transferred from each camera to the confirmation device 102. Subsequently, at a time t17, this transfer is completed. Note that herein, the completion time of the transfer from each camera is illustrated as the same time t17, but assume that some discrepancy exists among these times.

Note that, although not discussed above, in the multi-camera system 10A of FIG. 1, the settings and state of each camera are listed on the confirmation device 102 in advance, so as to avoid shooting mistakes. FIG. 13 illustrates an example of a list display of the settings and state of each camera. With this list display, prior to shooting, the user is able to grasp which cameras have incorrect settings, which cameras are low on battery, which cameras have little built-in memory remaining, and the like, thereby making it possible to keep trouble from occurring while in the middle of recording.

As discussed above, in the multi-camera system 10A illustrated in FIG. 1, an instruction signal to start and stop recording is transmitted from the confirmation device 102 to the cameras 101-A, 101-B, and 101-C, and in each camera, the image data of a certain segment obtained by the imager on the basis of the instruction signal is written to memory, while in addition, thumbnail image data is generated from the image data of a frame at a certain timing from among the image data of the certain segment and transmitted to the confirmation device 102. In the confirmation device 102, the respective thumbnail images are displayed on the display (panel 136) in association with each camera. For this reason, on the confirmation device 102, it is possible to favorably confirm whether or not a video was successfully shot as intended by each camera.

2. Modifications

Note that the foregoing embodiment illustrates an example for the case of three cameras. The present technology may also be applied similarly to the case of two cameras, or the case of four or more cameras. When there are many cameras, displaying the entirety of the confirmation screen on the confirmation device, such as the panel screen of a smartphone, for example, becomes difficult. However, in this case, it is sufficient to utilize a screen scrolling function to enable the user to view the entirety of the confirmation screen.

In addition, in the foregoing embodiment, the confirmation device 102 is described as being made up of a mobile terminal, such as a smartphone or a tablet, or a personal computer (PC). However, a multi-camera system 10B as illustrated in FIG. 14 is also conceivable. In this case, the multi-camera system 10B is made up of the cameras 101-A, 101-B, and 101-C as slave cameras, and a master camera 102B, in which the master camera 102B includes the functions of the confirmation device. In this case, the confirmation screen (see FIG. 9) is displayed on the panel (display) of the master camera 102B and provided for user confirmation.

Also, the foregoing embodiment illustrates an example in which the control interface is provided inside each camera. However, it is also conceivable not to provide the control interface inside each camera, but instead provide a control device external to the cameras.

FIG. 15 illustrates an exemplary configuration of a multi-camera system 10C for this case. In FIG. 15, portions corresponding to FIG. 1 are denoted with the same signs. Unlike the multi-camera system 10A illustrated in FIG. 1, each of the cameras 101-A, 101-B, and 101-C is not provided with a control interface (control I/F). Externally to the cameras 101-A, 101-B, and 101-C, a control device (Control Device A) 103-A, a control device (Control Device B) 103-B, and a control device (Control Device C) 103-C having functions similar to the control interface (control I/F) are provided, respectively.

Also, the foregoing embodiment illustrates an example in which the confirmation device 102 is provided separately from the cameras 101-A, 101-B, and 101-C. However, a configuration is also conceivable in which the confirmation device 102 is not provided, and instead, one of the cameras 101-A, 101-B, and 101-C doubles as the confirmation device. FIG. 16 illustrates an exemplary configuration of a multi-camera system 10D for this case. In FIG. 16, portions corresponding to FIG. 1 are denoted with the same signs.

Note that the multi-camera system 10D illustrated in FIG. 16 corresponds to the multi-camera system 10A illustrated in FIG. 1, but obviously a multi-camera system corresponding to the multi-camera system 10C illustrated in FIG. 15C may also be configured similarly. Although a detailed description is omitted herein, FIG. 17 illustrates an exemplary configuration of a multi-camera system 10E for such a case.

It should be understood by those skilled in the art that various modifications, combinations, sub-combinations and alterations may occur depending on design requirements and other factors insofar as they are within the scope of the appended claims or the equivalents thereof.

3. Application

The technology according to an embodiment of the present disclosure can be applied to various products. For example, the technology according to an embodiment of the present disclosure may be applied to a surgery room system. For example, the multi-camera system, camera, camera processing method, confirmation apparatus, and/or confirmation apparatus processing method according to certain embodiments of the present disclosure may be applied to a surgery room system.

In one embodiment, application of the present technology to the medical field, such as a surgery room system, allows an operator (e.g., a surgeon) to mark events during a medical procedure (e.g., a surgery) for subsequent review. The marked events allow the operator or any other person to later switch between video recorded by multiple cameras during playback.

For example, the multi-camera system 10A when incorporated in a surgery room system may include a ceiling camera 5187, surgery field camera 5189, and audiovisual controller 5107, as described below. The ceiling camera 5187 corresponds to the camera 101-A, the surgery field camera 5189 corresponds to the camera 101-B, and the confirmation apparatus 102 is incorporated in the audiovisual controller 5107, according to one embodiment. In other embodiments, the confirmation apparatus 102 is provided as a separate device (e.g., a mobile terminal such as a smartphone and a tablet, a personal computer, or the like).

In one embodiment, as noted above, a user (e.g., the operator or surgeon) uses the confirmation device 102 to perform an operation of starting and stopping the recording by each camera (e.g., the ceiling camera 5187 and surgery field camera 5189). Also, in the confirmation device 102, the user is able to perform a tagging operation, for example using the UI screen as illustrated in FIG. 3. As noted' above, the tagging operation is not limited to being performed one time within the segment from the start of recording until the end of recording, and may also be performed multiple times.

The confirmation device 102, as described above, transmits an instruction signal (command) to start and stop recording to each camera, in accordance with the operation of starting and stopping recording performed by the user. Each camera receives the instruction signal via a control interface (control I/F) constituting a communication part, and conducts an action in accordance with the instruction. In this case, each camera conducts a process of writing image data obtained by imaging with an imager to memory, in a certain segment from the start of recording until the end. Note that the control interface of each camera is built into each camera.

Further, as described above, the confirmation device 102 transmits an information signal carrying information about the time of tagging (timing) to each camera, in accordance with the tagging operation performed by the user. Each camera receives the information signal via the control interface (control I/F).

Also, on the confirmation device 102, the user is able to select whether to display on the display thumbnail images at some timing from among the certain segment from the start of recording until the end, after recording is stopped. This selection operation is performed in advance, before performing the operation of starting recording, for example using the UI screen illustrated in FIG. 4.

The confirmation device 102, as described above, transmits to each camera an information signal carrying the selected thumbnail image timing information. Each camera receives the information signal via the control interface (control I/F). After recording is stopped, each camera transmits to the confirmation device 102 the thumbnail image data generated from the image data of the frame at each timing indicated by the thumbnail image timing information.

On the basis of the thumbnail image data sent from each camera, the confirmation device 102 or other display apparatus (e.g., another PC or any of the plurality of display apparatus 5103A to 5103D described below) displays respective thumbnail images in association with each camera on the display. In this case, if thumbnail image data at multiple timings is sent, the thumbnail images at each timing are displayed by successively switching out the thumbnail images. In this case, identification information indicating which timing the thumbnail images correspond to may also be displayed at the same time.

Additionally, in this case, the thumbnail images may be switched out continuously, or alternatively, the thumbnail images at a certain timing, such as "Beginning", for example, may be displayed finally in a fixed manner. Also, after this fixed display, switching to a fixed display of the thumbnail images at a desired timing may be enabled with a user operation.

FIG. 18 is a view schematically depicting a general configuration of a surgery room system 5100 to which the technology according to an embodiment of the present disclosure can be applied. Referring to FIG. 18, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 18, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 18, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 19:
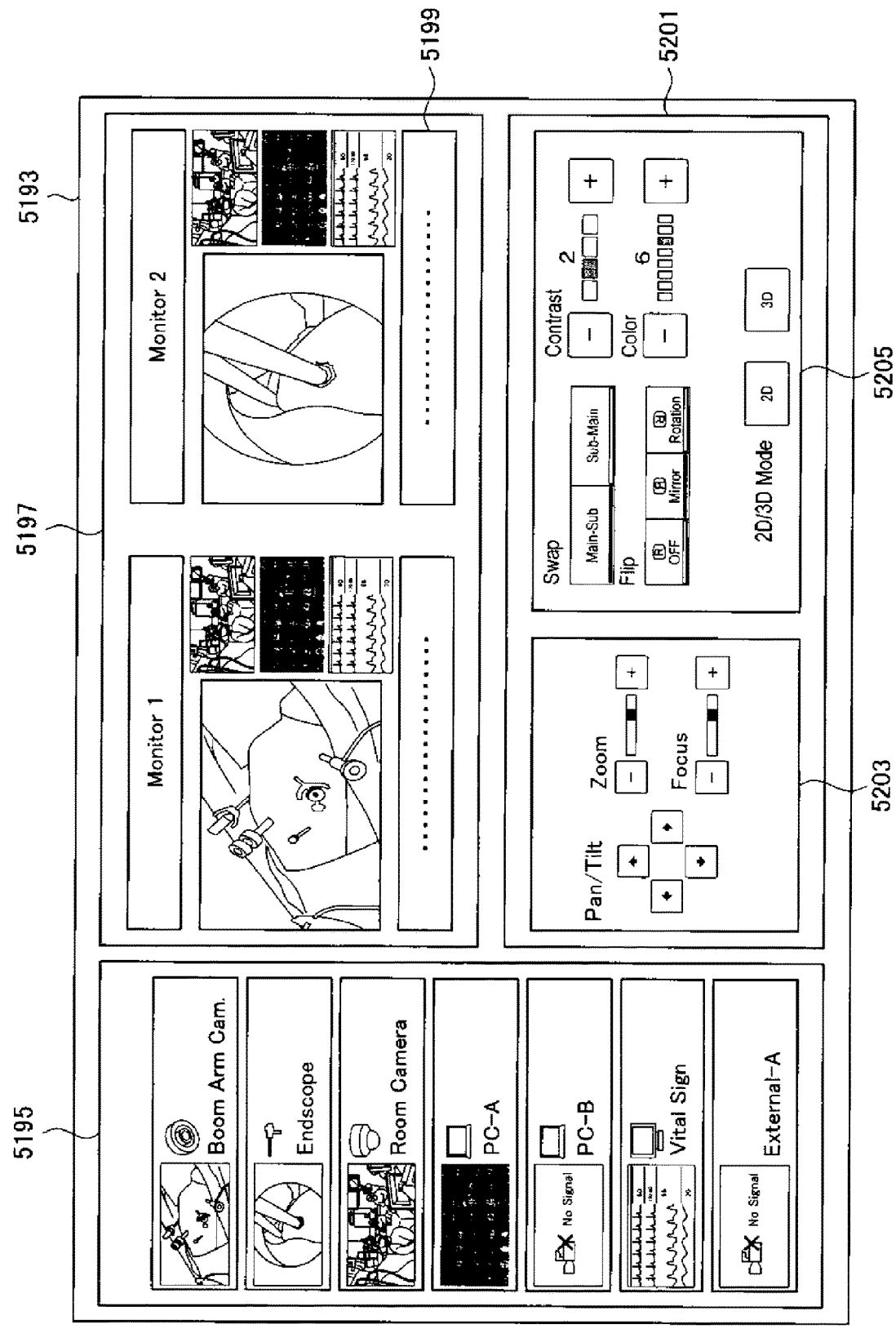
FIG. 19 is a view depicting an example of display of an operation screen image of a centralized operation panel.

FIG. 19 is a view depicting an example of display of an operation screen image on the centralized operation panel 5111. In FIG. 19, as an example, an operation screen image is depicted which corresponds to a case in which two display apparatus are provided as apparatus of an output destination in the surgery room system 5100. Referring to FIG. 19, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 20:
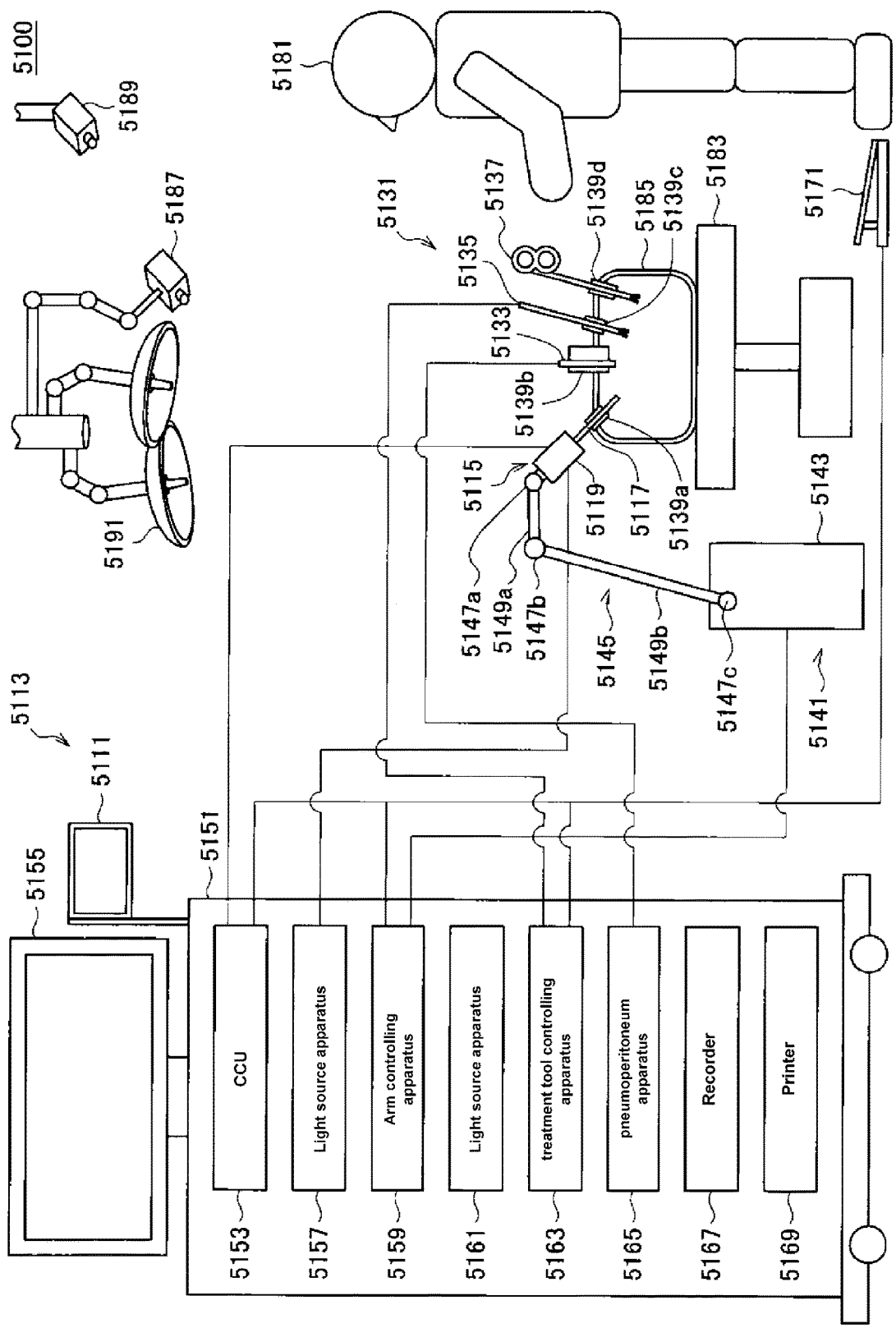
FIG. 20 is a view illustrating an example of a state of surgery to which the surgery room system is applied.

FIG. 20 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates light at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 20) as depicted in FIG. 18. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body lumens of the patient 5185 through the trocars 5139a to 5139d. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147a, 5147b and 5147c and links 5149a and 5149b and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is irradiated toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 18 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 20, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are irradiated time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue to irradiate light of a narrower band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 21:
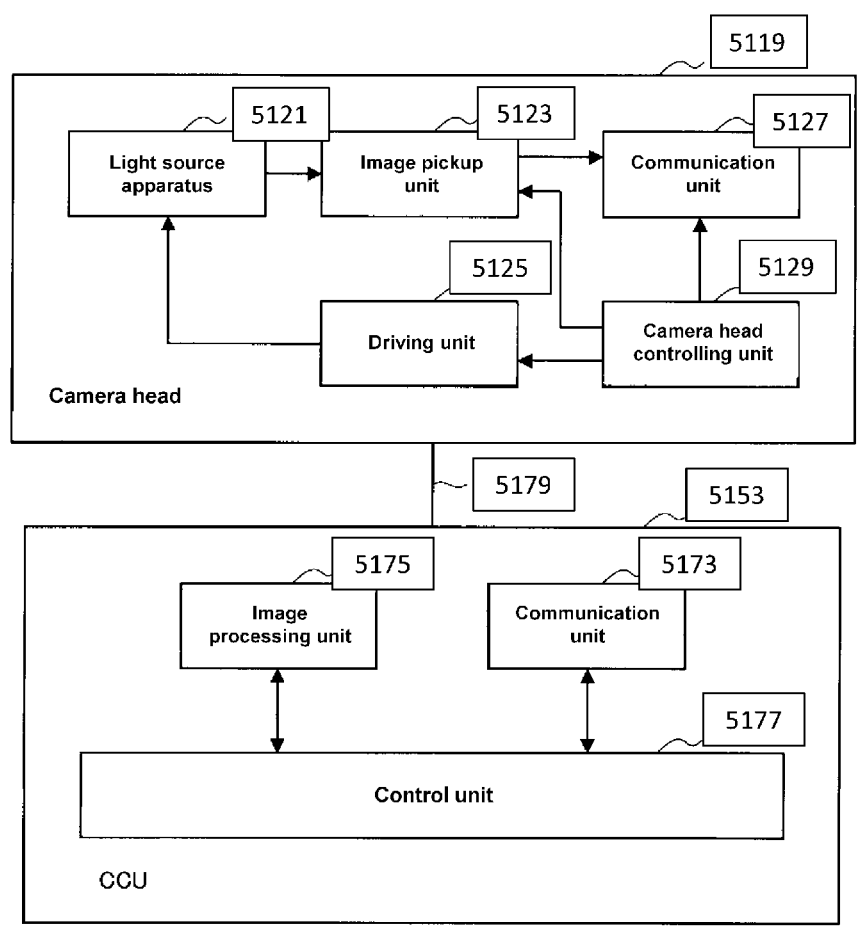
FIG. 21 is a block diagram depicting an example of a functional configuration of a camera head and a camera control unit (CCU) depicted in FIG. 20.

Functions of the camera head 5119 of the endoscope 5115 and the CCU 5153 are described in more detail with reference to FIG. 21. FIG. 21 is a block diagram depicting an example of a functional configuration of the camera head 5119 and the CCU 5153 depicted in FIG. 20.

Referring to FIG. 21, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5001 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display unit 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

Additionally, the present technology may also be configured as below.

(1) A multi-camera system, including a first camera apparatus; a second camera apparatus; and an information processing apparatus including a communication interface, and processing circuitry configured to receive a predetermined request from a user while the first camera apparatus captures a first video and the second camera apparatus captures a second video; in response to the predetermined request, transmit, via the communication interface, a first control signal to the first camera apparatus that causes the first camera apparatus to generate a first thumbnail of a frame of the first video, and transmit, via the communication interface, a second control signal to the second camera apparatus that causes the second camera apparatus to generate a second thumbnail of a frame of the second video; receive the first thumbnail from the first camera apparatus; and receive the second thumbnail from the second camera apparatus.

(2) An information processing apparatus, including a communication interface, and processing circuitry configured to receive a predetermined request from a user while a first camera apparatus captures a first video and a second camera apparatus captures a second video; and in response to the predetermined request, transmit, via the communication interface, a first control signal to the first camera apparatus that causes the first camera apparatus to generate a first thumbnail of a frame of the first video, and transmit, via the communication interface, a second control signal to the second camera apparatus that causes the second camera apparatus to generate a second thumbnail of a frame of the second video; receive the first thumbnail from the first camera apparatus; and receive the second thumbnail from the second camera apparatus.

(3) The information processing apparatus according to feature (2), in which a field of view of the first camera apparatus that captures the first video is different from a field of view of the second camera apparatus that captures the second video.

(4) The information processing apparatus according to feature (2) or (3), in which the processing circuitry is configured to output a user interface that includes the first and second thumbnails that are associated with the predetermined request in a single screen for display to the user.

(5) The information processing apparatus according to any of features (2) to (4), in which the single screen indicates a timing of the first video that is associated with the first thumbnail and a timing of the second video that is associated with the second thumbnail.

(6) The information processing apparatus according to any of features (2) to (5), in which the processing circuitry is configured to receive a start recording request from the user; and in response to the start recording request, transmit to the first camera apparatus a third control signal that causes the first camera apparatus to start capturing the first video, and transmit to the second camera apparatus a fourth control signal that causes the second camera apparatus to start capturing the second video.

(7) The information processing apparatus according to feature (6), in which the processing circuitry is configured to receive a stop recording request from the user; and in response to the start recording request, transmit to the first camera apparatus a fifth control signal that causes the first camera apparatus to end capturing of the first video, and transmit to the second camera apparatus a sixth control signal that causes the second camera apparatus to end capturing of the second video.

(8) The information processing apparatus according to any one of features (2) to (7), in which the processing circuitry is configured to output one or a combination of a remaining storage capacity, battery level, heat level, and communication status of each of the first and second camera apparatuses in a single screen for display to the user.

(9) The information processing apparatus according to any of features (2) to (8), in which the first camera apparatus captures the first video and the second camera apparatus captures the second video of the same object from different angles.

(10) A non-transitory computer-readable medium storing instruction which when executed by a computer cause the computer to perform a method of obtaining thumbnails, the method including receiving a predetermined request from a user while a first camera apparatus captures a first video and a second camera apparatus captures a second video; in response to the predetermined request, transmitting to the first camera apparatus a first control signal that causes the first camera apparatus to generate a first thumbnail of a frame of the first video, and transmitting to the second camera apparatus a second control signal that causes the second camera apparatus to generate a second thumbnail of a frame of the second video, receiving the first thumbnail from the first camera apparatus; and receiving the second thumbnail from the second camera apparatus.

(11) The non-transitory computer-readable medium according to feature (10), in which a field of view of the first camera apparatus that captures the first video is different from a field of view of the second camera apparatus that captures the second video.

(12) The non-transitory computer-readable medium according to feature (10) or (11), further including outputting a user interface that includes the first and second thumbnails that are associated with the predetermined request in a single screen for display to the user.

(13) The non-transitory computer-readable medium according to any of features (10) to (12), in which the single screen indicates a time within the first video that is associated with the first thumbnail and a time within the second video that is associated with the second thumbnail.

(14) The non-transitory computer-readable medium according to any of features (10) to (13), further including receiving a start recording request from the user; and in response to the start recording request, transmitting to the first camera apparatus a third control signal that causes the first camera apparatus to start capturing the first video, and transmitting to the second camera apparatus a fourth control signal that causes the second camera apparatus to start capturing the second video.

(15) The non-transitory computer-readable medium according to feature (14), further including receiving a stop recording request from the user; and in response to the start recording request, transmitting to the first camera apparatus a fifth control signal that causes the first camera apparatus to end capturing of the first video, and transmitting to the second camera apparatus a sixth control signal that causes the second camera apparatus to end capturing of the second video.

(16) The non-transitory computer-readable medium according to any of features (10) to (15), further including outputting one or a combination of a remaining storage capacity, battery level, heat level, and communication status of each of the first and second camera apparatuses in a single screen for display to the user.

(17) The non-transitory computer-readable medium according to any of features (10) to (16), in which the first camera apparatus captures the first video and the second camera apparatus captures the second video of the same object from different angles.

Furthermore, the present technology may also be configured as below.

(1) A multi-camera system, including:
a plurality of cameras; and
a confirmation device that is connected to the plurality of cameras in a wired or wireless manner, in which
each of the cameras includes
an imager,
a memory, and
a control unit that controls a process of writing, to the memory, image data of a certain segment obtained by being imaged by the imager, on a basis of an instruction signal to start and stop recording sent from the confirmation device, a process of generating thumbnail image data from image data of a frame at a certain timing from among the image data of the certain segment, and a process of transmitting the thumbnail image data to the confirmation device after the process of writing the image data of the certain segment to the memory is finished, and
the confirmation device includes
a display, and
a control unit that controls a process of transmitting the instruction signal to start and stop recording to the plurality of cameras, and a process of displaying respective thumbnail images in association with the plurality of cameras on the display, on a basis of the thumbnail image data sent from the plurality of cameras.

(2) The multi-camera system according to (1), in which the control unit of each of the cameras additionally controls a process of sending time information about a start and an end of the certain segment to the confirmation device after the process of writing the image data of the certain segment to the memory is finished, and the control unit of the confirmation device additionally controls a process of displaying respective start and end times of the certain segment in association with the plurality of cameras on the display, on a basis of the time information about the start and the end of the certain segment sent from the plurality of cameras.

(3) The multi-camera system according to (1) or (2), in which the control unit of each of the cameras additionally controls a process of transmitting camera settings information to the confirmation device after the process of writing the image data of the certain segment to the memory is finished, and the control unit of the confirmation device additionally controls a process of displaying an existence of a camera with different settings from the others on the display, on a basis of the camera settings information sent from the plurality of cameras.

(4) A camera, including:
an imager;
a memory; and
a control unit that controls a process of writing, to the memory, image data of a certain segment obtained by being imaged by the imager, on a basis of an instruction signal to start and stop recording sent from a confirmation device, a process of generating thumbnail image data from image data of a frame at a certain timing from among the image data of the certain segment, and a process of transmitting the thumbnail image data to the confirmation device after the process of writing the image data of the certain segment to the memory is finished.

(5) The camera according to (4), in which
the control unit additionally controls a process of transmitting time information about a start and an end of the certain segment to the confirmation device after the process of writing the image data of the certain segment to the memory is finished.

(6) The camera according to (4) or (5), in which
the control unit additionally controls a process of transmitting camera settings information to the confirmation device after the process of writing the image data of the certain segment to the memory is finished.

(7) The camera according to any of (4) to (6), in which
information about the certain timing is sent from the confirmation device.

(8) The camera according to (7), in which
the certain timing includes a timing at which a tagging operation is performed on the confirmation device.

(9) A processing method of a camera provided with an imager and a memory, the processing method including:
writing, to the memory, image data of a certain segment obtained by being imaged by the imager, on a basis of an instruction signal to start and stop recording sent from a confirmation device;
generating thumbnail image data from image data of a frame at a certain timing from among the image data of the certain segment; and transmitting the thumbnail image data to the confirmation device after the process of writing the image data of the certain segment to the memory is finished.

(10) A confirmation device, including:
a display; and
a control unit that controls a process of transmitting an instruction signal to start and stop recording to a plurality of cameras, and a process of displaying respective thumbnail images in association with the plurality of cameras on the display, on a basis of thumbnail image data sent from the plurality of cameras.

(11) The confirmation device according to (10), in which
the control unit additionally controls a process of displaying respective recording start and stop times in association with the plurality of cameras on the display, on a basis of time information about the starting and stopping of recording sent from the plurality of cameras.

(12) The confirmation device according to (10) or (11), in which
the control unit additionally controls a process of displaying an existence of a camera with different settings from the others on the display, on a basis of camera settings information sent from the plurality of cameras.

(13) The confirmation device according to any of (10) to (12), in which
the control unit additionally controls a process of setting a certain timing to generate the thumbnail image data from among a certain segment from the start of the recording until the end, and a process of transmitting information about the certain timing to the plurality of cameras.

(14) The confirmation device according to (13), in which
the certain timing includes a timing at which a tagging operation is performed.

(15) A processing method of a confirmation device provided with a display, the processing method including:
transmitting an instruction signal to start and stop recording to a plurality of cameras; and
displaying respective thumbnail images in association with the plurality of cameras on the display, on a basis of thumbnail image data sent from the plurality of cameras.

REFERENCE SIGNS LIST 10A, 10B, 10C, 10D, 10E multi-camera system
101, 101-A, 101-B, 101-C camera
102 confirmation device
102B master camera
103-A, 103-B, 103-C control device
111 CPU
112 memory
113 imager/lens unit
114 camera signal processing unit
115 codec processing unit
116 panel processing unit
117 panel
118 wired communication processing unit
119 wired LAN terminal
120 wireless communication processing unit
121 antenna
131 CPU
132 memory
133 codec processing unit
134 graphic processing unit
135 panel processing unit
136 panel
137 wired communication processing unit
138 wired LAN terminal 139 wireless communication processing unit
140 antenna
151 Start button
152 "Stop" button
153 "Tag" button
161 radio button
171 alert icon (exclamation mark)
181 operation button

The invention claimed is:

1. A multi-camera system, comprising:
a first camera apparatus;
a second camera apparatus; and
an information processing apparatus including:
  a communication interface, and
  processing circuitry configured to:
    detect a tag option being selected by a user from a menu and detect a tag operation performed on the information processing apparatus by the user while the first camera apparatus captures a first video and the second camera apparatus captures a second video; and
    in response to the tag operation detected, transmit a signal carrying a timing of the tag operation to the first camera apparatus and the second camera apparatus, the signal causing the first camera apparatus and the second camera apparatus to generate a first thumbnail from the first video captured at the timing of the tag operation and a second thumbnail from the second video captured at the timing of the tag operation respectively.

2. An information processing apparatus, comprising:
a communication interface, and
processing circuitry configured to:
  detect a tag option being selected by a user from a menu and detect a tag operation performed on the information processing apparatus while a first camera apparatus captures a first video and a second camera apparatus captures a second video; and
  in response to the tag operation detected, transmit a signal carrying a timing of the tag operation to the first camera apparatus and the second camera apparatus, the signal causing the first camera apparatus and the second camera apparatus to generate a first thumbnail from the first video captured at the timing of the tag operation and a second thumbnail from the second video captured at the timing of the tag operation respectively.

3. The information processing apparatus according to claim 2, wherein a first field of view of the first camera apparatus that captures the first video is different from a second field of view of the second camera apparatus that captures the second video.

4. The information processing apparatus according to claim 2, wherein the processing circuitry is configured to output a user interface that includes the first and second thumbnails that are associated with the tag operation in a single screen for display to the user.

5. The information processing apparatus according to claim 4, wherein the single screen indicates the timing of the tag operation.

6. The information processing apparatus according to claim 2, wherein the processing circuitry is configured to:
receive a start recording request from the user; and
in response to the start recording request,
  transmit to the first camera apparatus a first control signal that causes the first camera apparatus to start capturing the first video, and
  transmit to the second camera apparatus a second control signal that causes the second camera apparatus to start capturing the second video.

7. The information processing apparatus according to claim 2, wherein the processing circuitry is configured to output one or a combination of a remaining storage capacity, battery level, heat level, and communication status of each of the first and second camera apparatuses in a single screen for display to the user.

8. The information processing apparatus according to claim 2, wherein the first camera apparatus captures the first video and the second camera apparatus captures the second video of the same object from different angles.

9. A non-transitory computer-readable medium storing instruction which when executed by a computer cause the computer to perform a method of obtaining thumbnails, the method comprising:
detecting a tag option being selected by a user from a menu and detecting a tag operation performed by the user while a first camera apparatus captures a first video and a second camera apparatus captures a second video; and
in response to the tag operation detected, transmitting a signal carrying a timing of the tag operation to the first camera apparatus and the second camera apparatus, the signal causing the first camera apparatus and the second camera apparatus to generate a first thumbnail from the first video captured at the timing of the tag operation and a second thumbnail from the second vide captured at the timing of the tag operation respectively.

10. The non-transitory computer-readable medium according to claim 9, wherein a first field of view of the first camera apparatus that captures the first video is different from a second field of view of the second camera apparatus that captures the second video.

11. The non-transitory computer-readable medium according to claim 9, further comprising:
outputting a user interface that includes the first and second thumbnails that are associated with the tag operation in a single screen for display to the user.

12. The non-transitory computer-readable medium according to claim 11, wherein the single screen indicates the timing of the tag operation.

13. The non-transitory computer-readable medium according to claim 9, further comprising:
receiving a start recording request from the user; and
in response to the start recording request,
  transmitting to the first camera apparatus a first control signal that causes the first camera apparatus to start capturing the first video, and
  transmitting to the second camera apparatus a second control signal that causes the second camera apparatus to start capturing the second video.

14. The non-transitory computer-readable medium according to claim 9, further comprising:
outputting one or a combination of a remaining storage capacity, battery level, heat level, and communication status of each of the first and second camera apparatuses in a single screen for display to the user.

15. The non-transitory computer-readable medium according to claim 9, wherein the first camera apparatus captures the first video and the second camera apparatus captures the second video of the same object from different angles.

* * * * *